US008244529B2

(12) United States Patent
Wong

(10) Patent No.: US 8,244,529 B2
(45) Date of Patent: *Aug. 14, 2012

(54) MULTI-PASS ECHO RESIDUE DETECTION WITH SPEECH APPLICATION INTELLIGENCE

(75) Inventor: Ngai Chiu Wong, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,968

(22) Filed: Sep. 20, 2011

(65) Prior Publication Data

US 2012/0008752 A1    Jan. 12, 2012

Related U.S. Application Data

(63) Continuation of application No. 11/223,119, filed on Sep. 12, 2005, now Pat. No. 8,041,564.

(51) Int. Cl.
G10L 15/20 (2006.01)
G10L 11/02 (2006.01)
(52) U.S. Cl. ..................... 704/233; 704/226
(58) Field of Classification Search ........................ None
See application file for complete search history.

(56) References Cited

U.S. PATENT DOCUMENTS

| 5,668,865 | A | 9/1997 | Duttweiler et al. |
| 6,035,033 | A | 3/2000 | Von Pfeil et al. |
| 6,044,108 | A | 3/2000 | Bertness et al. |
| 6,178,162 | B1 | 1/2001 | Dal Farra et al. |
| 6,434,234 | B1 | 8/2002 | Walker |
| 6,449,361 | B1 | 9/2002 | Okuda |
| 6,570,986 | B1 | 5/2003 | Wu et al. |
| 6,744,884 | B1 | 6/2004 | Bjarnason |
| 6,744,885 | B1 | 6/2004 | Ketchum et al. |
| 6,766,019 | B1 | 7/2004 | Benesty et al. |
| 6,804,203 | B1 | 10/2004 | Benyassine et al. |
| 6,873,704 | B1 | 3/2005 | Park |
| 6,944,288 | B2 | 9/2005 | Seibert |
| 2002/0169602 | A1 | 11/2002 | Hodges |
| 2007/0055522 | A1 | 3/2007 | Wong |

*Primary Examiner* — Talivaldis Ivars Smits
(74) *Attorney, Agent, or Firm* — Greenblum & Bernstein, P.L.C.

(57) ABSTRACT

A method is provided for multi-pass echo residue detection. The method includes detecting audio data, and determining whether the audio data is recognized as speech. Additionally, the method categorizes the audio data recognized as speech as including an acceptable level of residual echo, and categorizes categorizing unrecognizable audio data as including an unacceptable level of residual echo. Furthermore, the method determines whether the unrecognizable audio data contains a user input, and also determines whether a duration of the user input is at least a predetermined duration, and when the user input is at least the predetermined duration, the method extracts the predetermined duration of the user input from a total duration of the user input.

20 Claims, 8 Drawing Sheets

MULTI-PASS ECHO RESIDUE DETECTION WITH SPEECH APPLICATION INTELLIGENCE

CROSS-REFERENCE TO RELATED APPLICATIONS

The present application is a continuation application of U.S. application Ser. No. 11/223,119, filed on Sep. 12, 2005, now U.S. Pat. No. 8,041,564, issued on Oct. 18, 2011, the contents of which are expressly incorporated by reference herein in its entirety.

BACKGROUND OF THE INVENTION

1. Field of the Invention

The present invention relates to speech recognition. More particularly, the present invention relates to detection of echo residue in speech recognition systems.

2. Background Information

Speech recognition systems may include a speech recognition engine that recognizes speech received from a user over an incoming channel. In a speech recognition system that interacts with a user, the recording from the incoming channel should not contain data from the outgoing channel. For example, in a system that uses system prompts to prompt a user to speak, system prompt signals should reside on the out going channel but should not carry over to the incoming channel. Echo residue occurs when signals on one channel (e.g., incoming) result from signals on another (e.g., outgoing) channel. Echo residue is responsible for users having poor experiences with new speech recognition systems. In particular, the echo residue on an incoming channel distorts the speech signals from the user that are to be recognized by a speech recognition system.

Moderate echo residue can mask a user's speech as noise, and render the system non-responsive to any user input. Loud echo residue may be improperly recognized as user input, in which case a condition known as "self barge-in" occurs. There are many causes of echo residue, including loud prompts, a poor terminating device at the switch, wrong echo-cancellation settings in the telephony board, electromagnetic (EM) interference from other equipment, bad channels, bad line cards and poor speech recognition engine parameter settings. Based on the cause, the problem may be experienced consistently by all users, selectively by users on certain channels, or temporarily by users during a particular dialog state/prompt in an application.

Numerous articles on the subject of echo residue address a severe and widespread echo residue problem. However, the intermittent types of echo residue are often not addressed. The result is that many mature speech systems are still plagued with periodic complaints from users in terms of responsiveness, but a technical team has no good way of tracking down the problem.

In many cases, the speech engine vendor is ultimately contacted to manually analyze volumes of data. The data is sometimes compiled by technical teams who manually listen to numerous user input wave files. Even for a 240 channel/3000 daily call system, weeks of man hours are dedicated for this troubleshooting, and the results are still often unsatisfactory. Although some platforms promise echo-free environments, there are no dedicated commercial products or tools that are designed to efficiently detect echo residue when it does occur. Echo residue detection is the first step to eliminating echo residue itself, particularly in situations where the echo residue is caused by factors outside of the control of the platform provider.

Unlike generic echo problems in other types of audio systems, echo residue in speech applications such as interactive voice response (IVR) applications may have very particular domain-specific causes. Thus, detection techniques may be used to isolate the causes of echo residue, and each identified cause can be individually addressed.

Commercial speech recognition engines are capable of recording the speech received over the incoming channel. FIG. 6 shows an exemplary plot portraying a recording of a conventional speech interaction on an incoming channel as amplitude versus time. In the example shown in FIG. 6, the amplitude of the recorded signal on the plot is flat when a system prompt is playing, as the user is quietly listening and providing no input. The spike shown in FIG. 6 occurs when the user speaks.

FIG. 7 shows an exemplary recording in a wave (.wav) file that contains echo residue in an incoming channel. When a user is listening to the incoming audio data shown in FIG. 7 (i.e., in the initial flat portion of the plot), significant echo residue is present. If a speech recognition system were capable of distinguishing when speech starts by the significantly higher amplitudes in the latter portion of the plot, it might seem that a speech recognition system could identify the echo residue by the low amplitude signals before the start of speech. However, as shown in FIG. 8, an exemplary recording that contains only normal environmental noise (e.g., cell phone static, background noise) in an incoming channel is very similar to the recording that contains echo residue as shown in FIG. 7. Accordingly, the environmental noise has characteristics essentially identical to echo residue, and cannot be identified by signal processing techniques such as low pass filtering. As a result, a tremendous commitment of time is required for a human to manually review audio files in order to distinguish between environmental noise and echo residue.

Accordingly, a need exists for multi-pass echo residue detection with speech application intelligence. To solve the above-described problems, multi-pass echo residue detection with speech application intelligence is provided.

DETAILED DESCRIPTION

Figure 1:
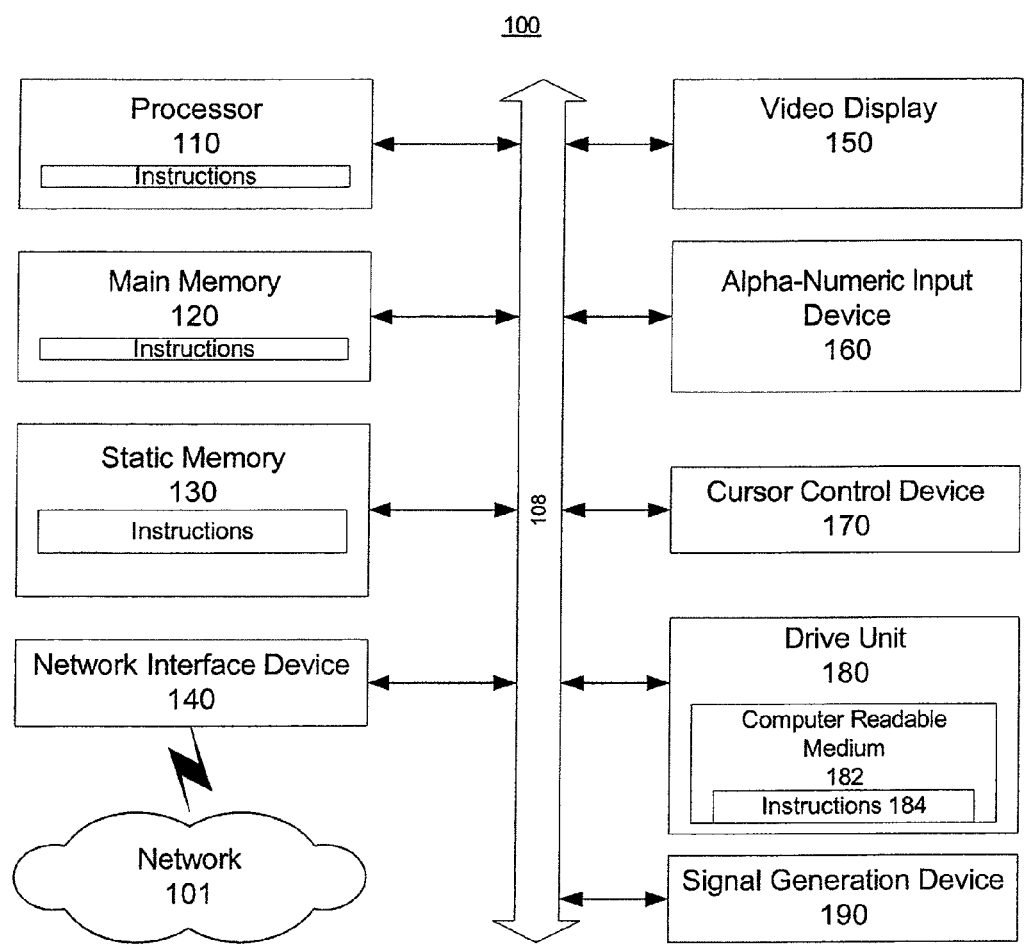
FIG. 1 shows an exemplary general computer system that includes a set of instructions for performing a method of multi-pass echo residue detection with speech application intelligence.

In view of the foregoing, the present invention, through one or more of its various aspects, embodiments and/or specific features or sub-components, is thus intended to bring out one or more of the advantages as specifically noted below.

According to an aspect of the present invention, a method is provided for detecting echo residue associated with a speech application. The method includes correlating audio data from an input channel with audio data from an output channel to obtain a correlation result. The method also includes comparing a determined value of the correlation result with a predetermined threshold. The method additionally includes categorizing the audio data for the input channel as including an acceptable level of residual echo when the determined value of the correlation result is greater than the predetermined threshold, and categorizing the audio data for the input channel as including an unacceptable level of residual echo when the determined value of the correlation result is less than the predetermined threshold.

According to another aspect of the present invention, the method also includes filtering audio data to determine whether the audio data should be further analyzed.

According to still another aspect of the present invention, the filtering also includes comparing a root mean square of the user input with a predetermined maximum threshold, and categorizing the user input as containing more than a predetermined level of noise when the root mean square of the user input is not less than the predetermined threshold.

According to yet another aspect of the present invention, the filtering also includes comparing a root mean square of the user input with a predetermined minimum threshold, and categorizing the user input as containing less than a predetermined level of noise when the root mean square of the user input is not greater than the predetermined threshold.

According to another aspect of the present invention, the filtering includes comparing a maximum amplitude of the user input with a predetermined threshold, and categorizing the user input as containing more than a predetermined level of noise when the maximum amplitude of the user input is not less than the predetermined threshold.

According to still another aspect of the present invention, the filtering includes determining whether the audio data contains user input.

According to yet another aspect of the present invention, the correlated audio data is audio data having a level of noise within a predetermined range.

According to another aspect of the present invention, the correlating also includes correlating user input from the input channel with a scripted audible prompt provided over the output channel.

According to yet another aspect of the present invention, the filtering includes determining whether the user input is at least a predetermined duration, and extracting the predetermined length of the user input when the user input is at least the predetermined duration.

According to still another aspect of the present invention, the correlating further includes correlating the predetermined duration of the user input with a predetermined duration of the scripted audible prompt, and classifying a correlation result according to a predetermined correlation threshold.

According to an aspect of the present invention, a computer readable medium is provided for storing a computer program that detects echo residue associated with a speech application. The computer readable medium includes an audio data correlating code segment that correlates audio data from an input channel with audio data from an output channel to obtain a correlation result. The computer readable medium also includes a comparing code segment that compares a determined value of the correlation result with a predetermined threshold. The computer readable medium further includes a categorizing code segment that categorizes the audio data for the input channel as including an acceptable level of residual echo when the determined value of the correlation result is greater than the predetermined threshold, and that categorizes the audio data for the input channel as including an unacceptable level of residual echo when the determined value of the correlation result is less than the predetermined threshold.

According to another aspect of the present invention, the computer readable medium also includes a filtering code segment that filters audio data to determine whether the audio data should be further analyzed.

According to still another aspect of the present invention, the filtering code segment compares a root mean square of the user input with a predetermined maximum threshold, and categorizes the user input as containing more than a predetermined level of noise when the root mean square of the user input is not less than the predetermined threshold.

According to yet another aspect of the present invention, the filtering code segment compares a root mean square of the user input with a predetermined minimum threshold, and categorizes the user input as containing less than a predetermined level of noise when the root mean square of the user input is not more than the predetermined threshold.

According to still another aspect of the present invention, the filtering code segment compares a maximum amplitude of the user input with a predetermined threshold, and categorizes the user input as containing more than a predetermined level of noise when the maximum amplitude of the user input is not less than the predetermined threshold.

According to another aspect of the present invention, the filtering code segment determines whether the audio data contains user input.

According to yet another aspect of the present invention, the correlated audio data is audio data having a level of noise within a predetermined range.

According to still another aspect of the present invention, the correlating code segment correlates user input from the input channel with a scripted audible prompt provided over the output channel.

According to another aspect of the present invention, the filtering code segment determines whether the user input is at least a predetermined duration, and extracts the predetermined length of the user input when the user input is at least the predetermined duration.

According to yet another aspect of the present invention, the correlating code segment correlates the predetermined duration of the user input with a predetermined length time of the scripted audible prompt, and classifies a correlation result according to a predetermined correlation threshold.

According to an aspect of the present invention, an echo residue detector associated with a speech application is provided. The echo residue detector includes an input port through which audio data from an input channel is received. The echo residue detector also includes an output port through which audio data from an output channel is transmitted. The echo residue detector further includes a processor that correlates the audio data from the input channel with the audio data from the output channel to obtain a correlation result. A determined value of the correlation result is compared with a predetermined threshold. The audio data for the input channel is categorized as including an acceptable level of residual echo when the determined value of the correlation result is greater than the predetermined threshold, and the audio data for the input channel is categorized as including an unacceptable level of residual echo when the determined value of the correlation result is less than the predetermined threshold.

According to another aspect of the present invention, the processor filters audio data to determine whether the audio data should be further analyzed.

According to still another aspect of the present invention, the filtering includes comparing a root mean square of the user input with a predetermined maximum threshold, and categorizing the user input as containing more than a predetermined level of noise when the root mean square of the user input is not less than the predetermined threshold.

According to yet another aspect of the present invention, the filtering includes comparing a root mean square of the user input with a predetermined minimum threshold, and categorizing the user input as containing less than a predetermined level of noise when the root mean square of the user input is not greater than the predetermined threshold.

According to another aspect of the present invention, the filtering includes comparing a maximum amplitude of the user input with a predetermined threshold, and categorizing the user input as containing more than a predetermined level of noise when the maximum amplitude of the user input is not less than the predetermined threshold.

According to still another aspect of the present invention, the filtering includes determining whether the audio data contains user input.

According to yet another aspect of the present invention, the correlated audio data is audio data having a level of noise within a predetermined range.

According to another aspect of the present invention, user input from the input channel is correlated with a scripted audible prompt provided over the output channel.

The present invention leverages speech domain-specific techniques to detect speech application echo residue. As described herein, simple analysis and on-board cancellation concepts are used for fast, accurate and automated echo residue detection. Because echo residue detection is needed before one can eliminate echo residue, the present invention can be used as a basis for taking remedial steps to determine causes for echo residue, and for taking steps to eliminate the causes of echo residue.

Referring to FIG. 1, an illustrative embodiment of a general computer system, on which multi-pass echo residue detection with speech application intelligence can be implemented, is shown and is designated 100. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using a general computer system as shown in FIG. 1, multiple filters may be used to determine which audio data is most likely to include acceptable levels of residual echo, which audio data is most likely not to include acceptable levels of residual echo, and which audio data is unsuitable for analysis. Audio data from an incoming channel that passes through the filters can be correlated with audio data from an outgoing channel to perform the actual detection of residual echo. By eliminating some audio data from consideration without correlation, multi-pass echo residue detection with speech application intelligence can avoid committing the significant computing resources that would otherwise be necessary to correlate all incoming audio data for a speech application. The use of filters is capable of effectively eliminating 80% or more of input wave files without requiring the correlation of signals from the incoming channel and the outgoing channel.

Figure 2:
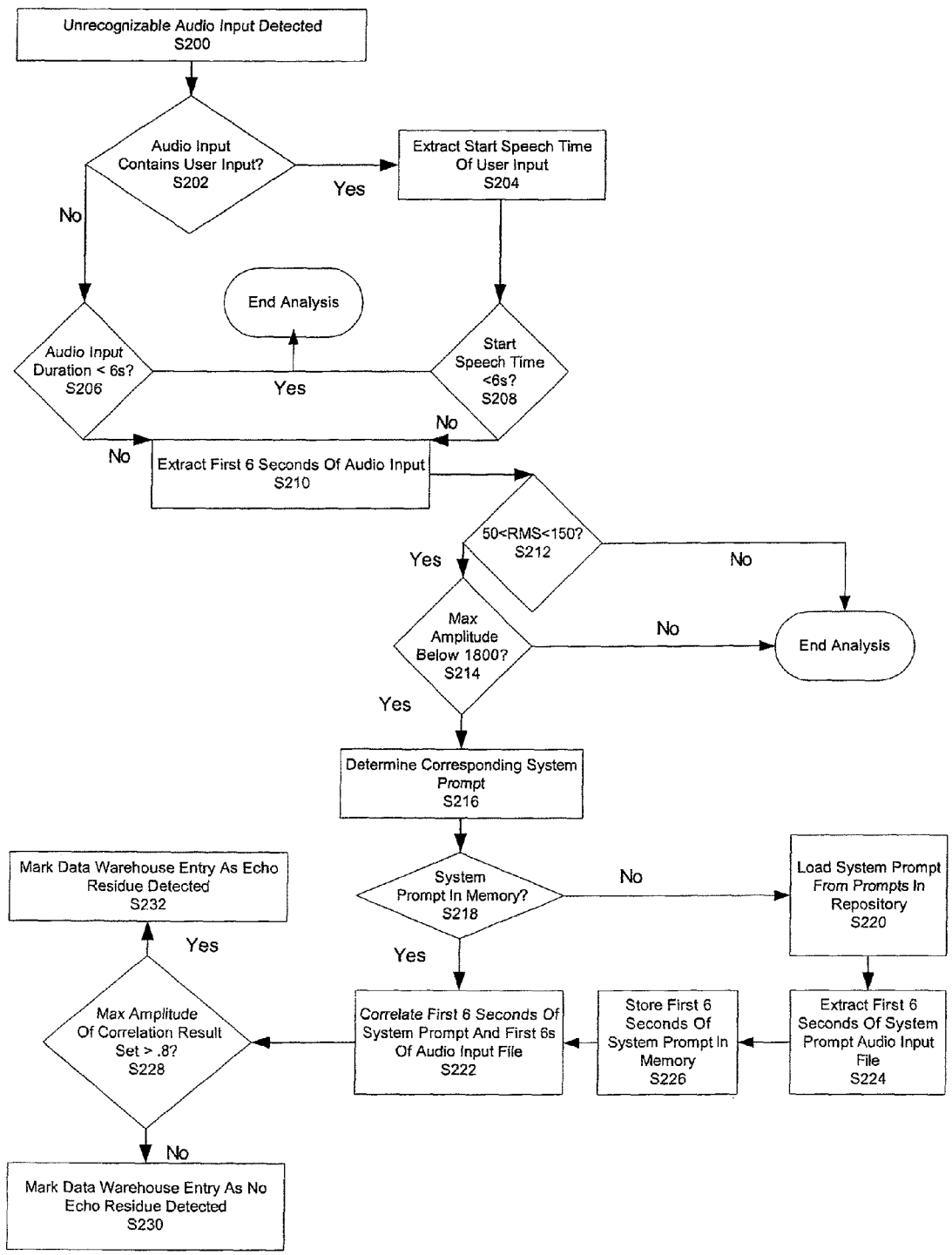
FIG. 2 shows an exemplary method for multi-pass echo residue detection.

FIG. 2 shows an exemplary method for multi-pass echo residue detection. To be exact, FIG. 2 shows an exemplary multi-pass echo residue detection algorithm. Numeric values used in the algorithm are for illustration purposes, and values used in operation may be adjusted as appropriate.

At S200, a determination is made that unrecognizable audio input has been detected based on data in a speech recognition engine log. If the audio input is recognized, the signal is deemed to contain an acceptable level of echo residue that does not warrant analysis using the method shown in FIG. 2. When the determination is made at S200 that unrecognizable audio input has been detected, information from a recognition log or other information repository is fed to a software component which analyzes the information and determines that audio data is present. In the embodiment shown in FIG. 2, the information from the speech recognition engine log includes a wave (.wav) file of audio data. The analysis of information from the recognition engine log may occur in real-time, or may be performed periodically on a batch of data. At S202, a determination is made whether the audio input contains user input. If the audio input contains user input (S202=Yes), the time where speech started is extracted from the speech recognition engine log at S204.

When the wave file contains speech, only the pre-"start of speech" section should be used for comparison with the system prompt. In the case where the wave file does not contain user speech, the input file should be at least the duration of the system prompt. In the embodiment shown in FIG. 2, system speech prompts are designed to last at least 6 seconds. Accordingly, the wave file of audio data should contain at least 6 seconds of speech from a speech prompt, even if no user speech is contained in the audio input.

In the embodiment of FIG. 2, the pre-"start of speech" duration needs to have a minimum duration of, e.g., at least 4 seconds for wave files at an 8000 KHz sampling rate, for the echo residue detection to be reliable. If the pre-"start of speech" duration is not the minimum duration, e.g., at least 4 seconds for wave files at an 8000 KHz sampling rate, the risk of false accepts is unacceptable due to sampling error and similarity of different speech patterns having similar numbers of syllables. However, correlation beyond a certain data length provides little return on accuracy, at the cost of computational time. For the embodiment shown in FIG. 2, 6 seconds is used as an optimal cut off duration. Since speech less than 6 seconds yields poor analysis results, the analysis ends.

A determination is made at S208 whether the time when speech started is less than a predetermined threshold of 6 seconds. If the time when speech started is less than 6 seconds (S208=Yes), the analysis ends.

If the audio input does not contain user input (S202=No), a determination is made whether the duration of the audio data is less than the predetermined threshold of 6 seconds at S206. If the duration of the audio data is less than 6 seconds (S206=Yes), the analysis ends.

If the time where speech started is not less than the predetermined threshold of 6 seconds (S208=No), or if the duration of the audio data is not less than 6 seconds (S206=No), the first 6 seconds of the audio data is extracted at S210.

The next set of filters shown in FIG. 2 determine that the first 6 seconds contains a low level of noise. For analysis of a large data sample, rather than amplitude, root mean square (RMS) is used as a first indicator of consistent noise. When RMS below 50, noise is judged to be tolerable. Further, when RMS is below 50, the level of echo is determined to be acceptable. No on-board echo-canceling system is perfect, so allowing for a negligible level of echo would avoid the analysis to be over-sensitive.

When the RMS is over 150, however, it usually indicates significant background noise such as static or heavy breathing, and not echo residue. Accordingly, a determination is made at S212 whether the root mean square is between 50 and 150. If the root mean square is not between 50 and 150 (S212=No), the analysis ends.

After the RMS filtering, the system checks for maximum amplitude, to eliminate files with speech that is early and soft, speech that the recognition engine fails to recognize. The amplitude check also eliminates audio files with loud noise such as a cough, noise from switching from speaker to headset, noise from the headset coming in contact with another object, etc. Only rare cases of loud noises are expected, but the analysis obtains better results by dismissing audio data with abnormally high maximum amplitude in order to avoid misclassification due to biases created by a sharp spike in amplitude. Accordingly, if the root mean square is between 50 and 150 (S212=Yes), a determination is made at S214 whether the maximum amplitude is below 1800. If the maximum amplitude is not below 1800 (S214=No), the analysis ends.

If audio data is not filtered out in the RMS and amplitude checks at S212 and S214, the audio data will be cross-correlated. Since the speech prompts are consistent, the speed of analysis can be increased by caching the first 6 seconds from the prompt wave files to further increase speed. In an analysis that involves tens of thousands of wave files, for an application that only has a few dozen dialog states, the difference in performance may be very significant. At S216, the system prompt which corresponds to the user audio data is determined. At S218, a determination is made whether the determined system prompt has been cached in a memory. If the determined prompt is not stored in the memory (S218=No), the prompt is loaded from a repository at S220. The first 6 seconds of the prompt are extracted at S224 and the first 6 seconds of the extracted prompt are stored at S226. If the system prompt is already stored in the memory (S218=Yes), or after storing the system prompt in the memory at S226, the appropriate system prompt and the first 6 seconds of the input wave file of user audio data are correlated at S222.

A determination is made at S228 whether the amplitude of the maximum correlation result is greater than a predetermined threshold. In the embodiment shown in FIG. 2, the predetermined correlation threshold is 0.8. If the maximum amplitude is not greater than the predetermined threshold (S228=No), the audio input is marked as having a satisfactory level of echo residue and the data is input into a data warehouse. If the maximum amplitude is greater than the predetermined threshold (S228=Yes), the audio input is marked as having an unsatisfactory level of echo residue, and the data is input into a data warehouse as evidence of echo residue.

Once in the data warehouse, multiple audio input samples can be combined with other call data, and an administrator (or automated program) can determine if any patterns exist. For example, one might find all the echo residue situations occur on particular voice channels, or dialog states, or originating caller IDs. Therefore, data that is marked as having an unsatisfactory level of echo residue can be mined to determine the cause or source of echo residue. Accordingly, the input audio data from the speech recognition engine log is accompanied by identifying information such as source, channel and system prompt. The identifying information may also include an identification of an interactive speech recognition platform that was used to interact with the caller who experienced echo residue.

Figure 3:
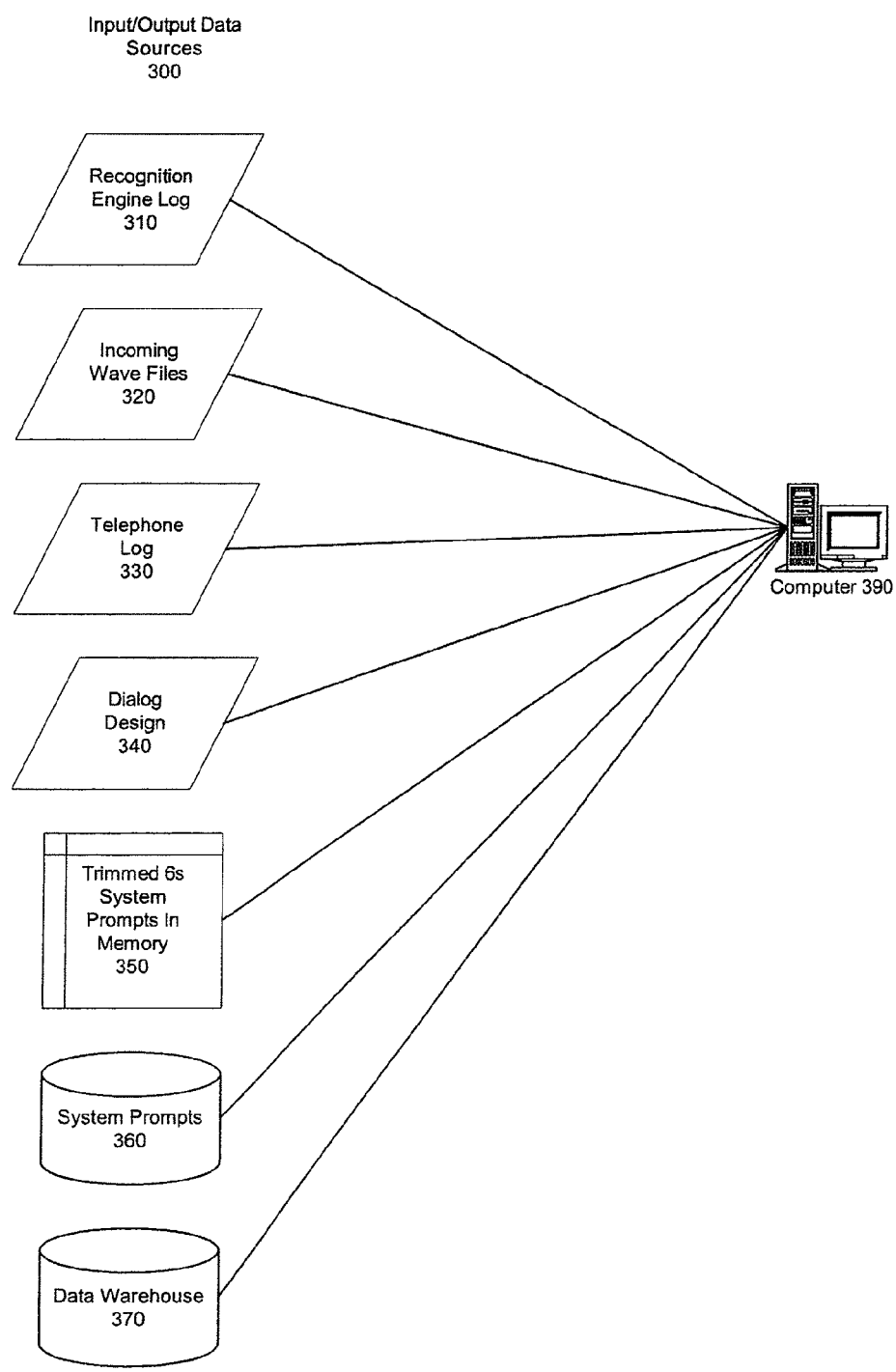
FIG. 3 shows an exemplary array of data sources that provide data to a computer system that performs a method of multi-pass echo residue detection.

FIG. 3 shows an exemplary array of data sources that provide data to and/or receive data from a computer system 390 such as the computer system shown in FIG. 1. In particular, a computer system that performs the echo residue detection may receive data from a recognition engine log 310, incoming wave files 320, a telephone log 330, a dialogue design tool 340, trimmed system prompts 350 in a memory and/or a database of system prompts 360. The computer system 390 stores detection results and identifying information in a data warehouse 370.

Figure 4:
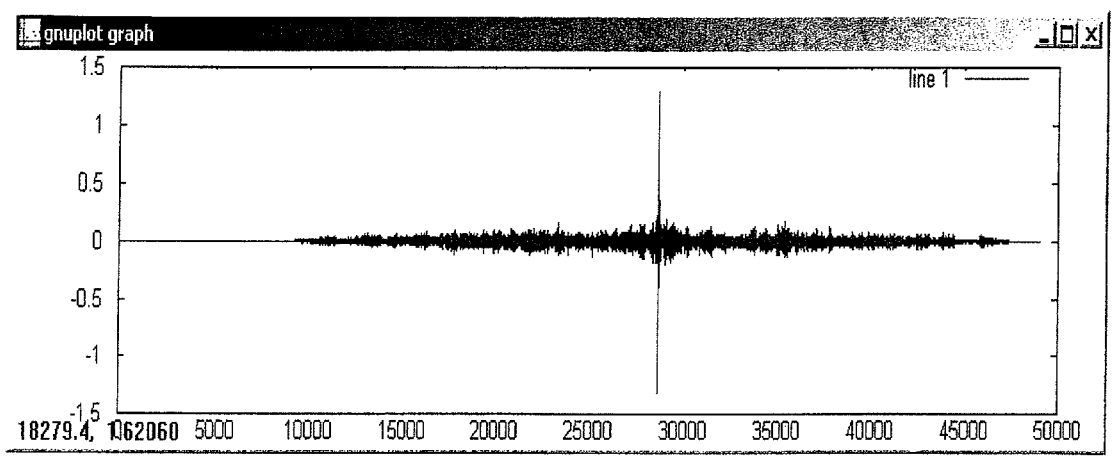
FIG. 4 shows an exemplary plot of echo residue with a corresponding system prompt.
Figure 5:
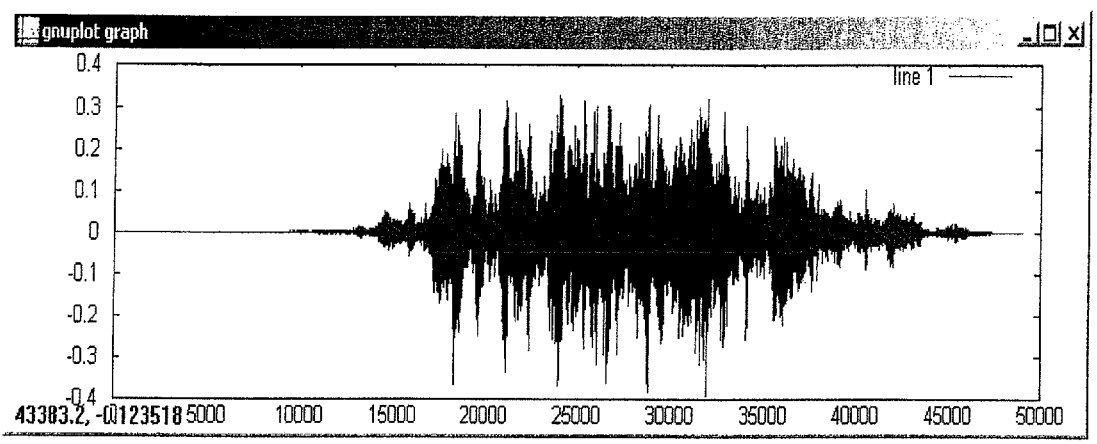
FIG. 5 shows an exemplary plot of environmental noise with a corresponding system prompt.
Figure 6:
FIG. 6 shows an exemplary recording of a conventional speech interaction on an incoming channel.
Figure 7:
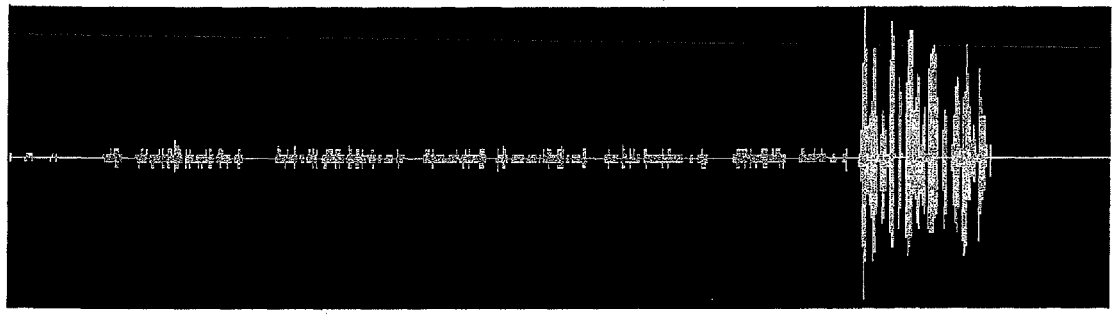
FIG. 7 shows an exemplary recording that contains echo residue for a conventional speech interaction on an incoming channel.
Figure 8:
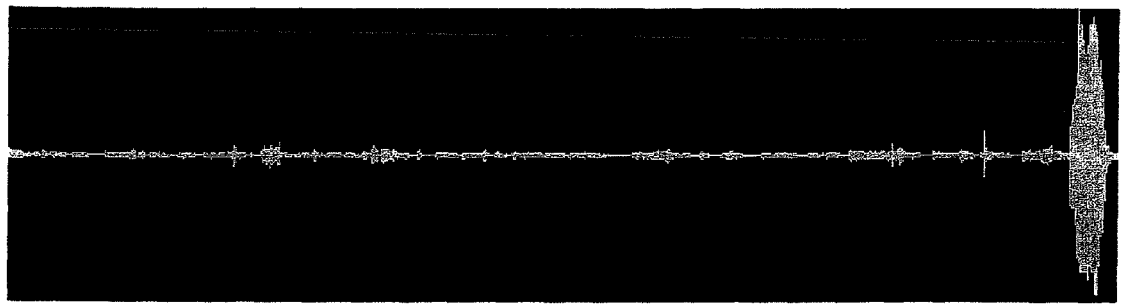
FIG. 8 shows an exemplary recording that contains environmental noise for a conventional speech interaction on an incoming channel.

FIGS. 4 and 5 show exemplary plots of audio data that will result in different outcomes according to the method shown in FIG. 2. In particular, FIG. 4 shows an exemplary plot of echo residue with a corresponding system prompt. Using the speech application intelligence described above, a process of distinguishing residual echo from noise on audio recordings is automated. Each dialog between the user and the system is scripted for a speech application.

The wave files played by the system are predetermined, and either documented in a dialog design tool as shown in FIG. 3, or captured in a real-time telephony log. A dialog design tool documents the dialog between the user and the speech recognition system, and specifies which prompts to play following each user response. A real-time telephony log contains the actual wave file name that the telephony platform played to the user. A system prompt is correlated with a low volume signal from the input channel, so that the detection of echo residue is automated. The echo detection program examines the peak value of the correlation result at S228, and determines whether a high correlation exists between the input and output signals. In FIG. 4, a prominent peak is clearly shown. The prominent peak demonstrates the two signals are highly correlated so that the audio data in FIG. 4 would be classified as having unacceptable residual echo.

FIG. 5 shows an exemplary plot of environmental noise with a corresponding system prompt. In the case of noise crossing with the corresponding system prompt, the result is completely different from the case of echo residue shown in FIG. 4. The plot of noise crossing includes a much lower peak value, and the audio data shown in FIG. 5 would be classified as having acceptable residual echo.

As explained herein, the detection of residual echo can be automated for speech applications such as speech recognition engines. By automating the detection of residual echo, user audio input data can be classified as having either an acceptable or unacceptable level of residual echo. Further, user audio input data can be parsed with one or more filters so that large amounts of correlation processing can be avoided for user audio input data that is not likely to produce reliable results. This optimization of the analysis results can be used to isolate the strongest examples of residual echo, such that the causes of the residual echo can be identified and remedied.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A method for multi-pass echo residue detection, the method comprising:
   detecting audio data;
   determining whether the audio data is recognized as speech;
   categorizing the audio data recognized as speech as including an acceptable level of residual echo,
   categorizing unrecognizable audio data as including an unacceptable level of residual echo;
   determining whether the unrecognizable audio data contains a user speech input;
   determining whether a duration of the user speech input is at least a predetermined duration, and when the user speech input is at least the predetermined duration, extracting the predetermined duration of the user speech input from a total duration of the user speech input.

2. The method for multi-pass echo residue detection of claim 1, further comprising:
   ending a further analysis when the user speech input is not at least the predetermined duration.

3. The method for multi-pass echo residue detection of claim 2, further comprising:
   determining whether a duration of the unrecognizable audio data not containing a user speech input is at least a predetermined duration, and when the unrecognizable audio data not containing a user speech input is at least the predetermined duration, extracting the predetermined duration of the unrecognizable audio data not containing a user speech input for further analysis.

4. The method for multi-pass echo residue detection of claim 3, further comprising:
   ending the further analysis when the unrecognizable audio data not containing a user speech input is not at least the predetermined duration.

5. The method for multi-pass echo residue detection of claim 1, further comprising:
   root mean square filtering the predetermined duration of the user speech input to determine the level of consistent noise in the predetermined duration of the user speech input.

6. The method for multi-pass echo residue detection of claim 5, further comprising:
   determining that the consistent noise in the predetermined duration of the user speech input is acceptable, when the consistent noise in the predetermined duration of the user speech input is below a first predetermined consistent noise threshold.

7. The method for multi-pass echo residue detection of claim 6, further comprising:
   ending further analysis of the predetermined duration of the user speech input when the consistent noise in the predetermined duration of the user speech input is determined to be above a second predetermined consistent noise threshold,
   wherein the second predetermined consistent noise threshold is set higher than the first predetermined consistent noise threshold.

8. The method for multi-pass echo residue detection of claim 7,
   wherein the first predetermined consistent noise threshold is set at 50 root mean square, and the second predetermined consistent noise threshold is set at 150 root mean square.

9. The method for multi-pass echo residue detection of claim 5, further comprising:
   checking an amplitude of the predetermined duration of the user speech input when the consistent noise in the predetermined duration of the user speech input is determined to be equal to or above the first predetermined consistent noise threshold, and equal to or below the second predetermined consistent noise threshold.

10. The method for multi-pass echo residue detection of claim 9,
    wherein checking the amplitude includes comparing a maximum amplitude in the predetermined duration of the user speech input with a predetermined maximum amplitude threshold, and ending further analysis when the maximum amplitude in the predetermined duration of the user speech input is equal to or greater than the maximum amplitude threshold.

11. The method for multi-pass echo residue detection of claim 10, further comprising:
    correlating the predetermined duration of the user speech input with an a reference audio file when the predetermined maximum amplitude is less than the maximum amplitude threshold.

12. The method for multi-pass echo residue detection of claim 11, further comprising:
    determining an amplitude of a maximum correlation result,
    comparing the amplitude of the maximum correlation result with a predetermined maximum correlation threshold, and
    determining that the user speech input has an acceptable level of echo residue when the amplitude of the maximum correlation result is equal to or less than the predetermined maximum correlation threshold.

13. The method for multi-pass echo residue detection of claim 12, further comprising:
    determining that the user speech input has an unacceptable level of echo residue when the amplitude of the maximum correlation result is greater than the predetermined maximum correlation threshold.

14. The method for multi-pass echo residue detection of claim 13, further comprising:
   storing the user speech input determined as having an acceptable level of echo residue and the user speech input determined as having an unacceptable level of echo residue in a data warehouse.

15. The method for multi-pass echo residue detection of claim 14, further comprising:
   sampling selected stored samples of user speech input stored in the data warehouse,
   retrieving call data related to the selected stored samples of user speech input, and
   determining characteristic patterns based on the selected stored samples of user speech input and the retrieved call data.

16. The method for multi-pass echo residue detection of claim 14, further comprising:
   determining a source of echo residue based on selected stored samples of user speech input stored in the data warehouse, and
   removing the determined source of echo residue.

17. The method for multi-pass echo residue detection of claim 1,
   wherein the predetermined duration is approximately six seconds.

18. The method for multi-pass echo residue detection of claim 1, further comprising:
   lowering an amount of echo residue from a determined source of echo residue.

19. A non-transitory computer readable storage medium for storing a computer program for multi-pass echo residue detection, the medium comprising:
   a detecting segment for detecting audio data;
   a speech recognition determining segment for determining whether the audio data is recognized as speech;
   a speech recognition audio data categorizing segment for categorizing the audio data recognized as speech as including an acceptable level of residual echo,
   an unrecognizable audio data categorizing segment for categorizing unrecognizable audio data as including an unacceptable level of residual echo;
   a user speech input determining segment for determining whether the unrecognizable audio data contains a user speech input;
   a user speech input duration determining segment for determining whether a duration of the user speech input is at least a predetermined duration, and when the user speech input is at least the predetermined duration, extracting the predetermined duration of the user speech input from a total duration of the user speech input.

20. A multi-pass echo residue detector, comprising:
   a detector that detects audio data;
   a speech recognizer that determines whether the audio data is recognized as speech;
   a processor that categorizes the audio data recognized as speech as including an acceptable level of residual echo, and categorizes unrecognizable audio data as including an unacceptable level of residual echo,
   wherein the processor determines whether the unrecognizable audio data contains a user speech input, and determines whether a duration of the user speech input is at least a predetermined duration, and when the user speech input is at least the predetermined duration, the processor extracts the predetermined duration of the user speech input from a total duration of the user speech input.

* * * * *